United States Patent [19]

Kogan

[11] Patent Number: 5,142,427
[45] Date of Patent: Aug. 25, 1992

[54] MAGNETIC TRANSDUCER PRESSURE PAD
[75] Inventor: Eduard Kogan, Queens, N.Y.
[73] Assignee: Miltope Corporation, Melville, N.Y.
[21] Appl. No.: 545,059
[22] Filed: Jun. 28, 1990
[51] Int. Cl.$^5$ .................. G11B 25/04; G11B 15/60
[52] U.S. Cl. .................. 360/130.3; 360/2; 360/130.31
[58] Field of Search .................. 360/2, 130.3, 130.31, 360/130.32, 130.33, 128; 242/198

[56] References Cited
U.S. PATENT DOCUMENTS

| 2,644,690 | 7/1953 | Krag | 360/130.31 |
| 3,749,851 | 7/1973 | Nakamichi | 360/130.31 |
| 4,062,050 | 12/1977 | Shigemori et al. | 360/130.3 |
| 4,129,892 | 12/1978 | Kasu et al. | 360/128 |
| 4,573,095 | 2/1986 | Bordignon | 360/130.31 |
| 4,638,392 | 1/1987 | Akatsu | 360/130.32 |
| 4,851,941 | 7/1989 | Ohkita et al. | 360/130.3 |

FOREIGN PATENT DOCUMENTS 61-283065 12/1986 Japan .................. 360/130.3

Primary Examiner—A. J. Heinz
Assistant Examiner—Jefferson Evans
Attorney, Agent, or Firm—Whitham & Marhoefer

[57] ABSTRACT

A pressure pad for urging a document against a magnetic recording head has an elastameric belt with a low friction, wear resistant coating which urges the document against the head.

4 Claims, 2 Drawing Sheets

MAGNETIC TRANSDUCER PRESSURE PAD

BACKGROUND OF THE INVENTION

1. Field of the Invention

The present invention generally relates to reading and writing information on a plurality of closely adjacent magnetic stripes on a card-like document, such as an airline ticket, and more particularly to an improved pressure pad for urging the stripes on the document into continuous contact with the transducer head.

2. Description of the Prior Art

The airline industry has adopted and is introducing a standard ticket for passengers. This ticket comprises a document in which alphanumeric information is printed on one side and magnetically encoded on four parallel magnetic tracks on the other side. The tracks are about three-sixteenths of an inch wide and separated by a gap on the order of fifteen-one-thousandth of an inch. The transducing head used to record and read information on the tracks advantageously includes both a reading transducer and a writing transducer, with the readwrite transducer separated by a small gap, on the order of three-hundred-fifty-thousandths of an inch.

It will be appreciated that all of the tracks must be kept continuously in contact with the transducent head, which is difficult to accomplish owing to the relatively large cumulative width of the four tracks. If too much pressure is applied to the document as it passes under the head there is a tendency to jam the operation. At lower pressures, using prior art pressure devices, such as rollers, there is a tendency for the pressure pad to vibrate so that reliable contact cannot be made between the transducing head and the magnetic stripes across all four tracks, a condition necessary for satisfactory operation.

SUMMARY OF THE INVENTION

It is therefore an object of the present invention to provide a pressure pad which will establish continuous contact between the transducer head and all magnetic tracks on the document at low contact pressure. Low contact pressure reduces any tendency for the system to jam, and in addition significantly prolongs head life.

Briefly, this invention contemplates the provision of a pressure pad in which an elastomeric belt with a low friction wear resistant coating on its surface urges the document into contact with the head. The belt is supported under slight tension on a base and is wide enough to span all of the tracks on the document. A spring urges a plate against the belt which in turn pushes the belt towards the transducent head, across entire width of the transducer and for a substantial length on either side of the transducer gaps. The belt tension is low so that the belt has a heavily damped low frequency response, while the response frequency of the spring and plate is relatively higher. This combination provides a quick, flexible response across the entire transducing head at low pressures, without oscillation.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
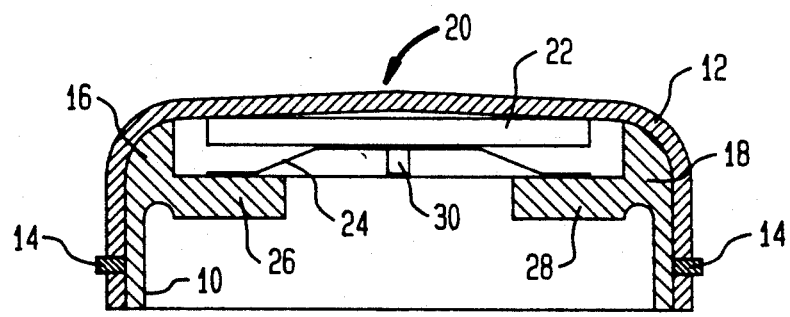
FIG. 1 is a partial, sectional, side elevation of a preferred embodiment of a pressure pad in accordance with the teachings of this invention.
Figure 2:
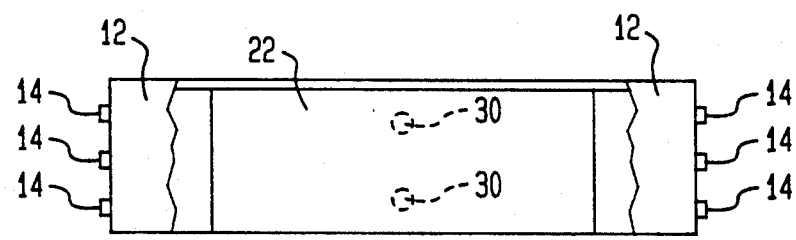
FIG. 2 is a plan view, with parts broken away of the pressure pad shown in FIG. 1.

Referring now to the drawings, and more particularly to FIGS. 1 and 2, a pressure pad includes a base 10 to which is secured a elastomeric band or belt 12. The band 12 is preferably coated with a low friction wear resistant material. The band 12 is under tension and may be secured to the base 10 by means of tabs 14 which can be formed integrally with the base 10.

The base 10 has a pair of rounded shoulders 16 and 18 and the band 12 stretches between the shoulders 16 and 18. The flat smooth surface of band 12, indicated by the general reference numeral 20, urges the document into contact with the transducer head.

Figure 3:
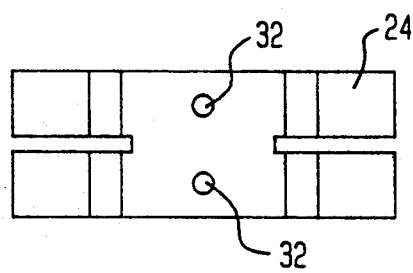
FIG. 3 is a detailed plan view of the spring used to urge the plate against the belt in the embodiment of the invention shown in FIG. 1.

Referring now to FIG. 3 in addition to FIGS. 1 and 2, a plate 22 mounted on a compression spring 24, which in turn rests on ledges 26 and 28 formed in the base 10, urges the band 12 outward with respect to the base 10. The plate 22 may be made of a suitable non-magnetic material such as aluminum, brass, or a ferrite. The plate 22 is as wide as the band is wide. Pins 30 secure the spring 24 to the plate 22. Preferably the pins 30 are fixed to the plate 22 and fit through openings 32 in the spring 24. The spring 24 has a pair of legs marked 25 and 27 on either side of a central region 29 which contacts the plate 22. This enhances the lateral and longitudinal resiliency of the pad system including belt 12.

Figure 4:
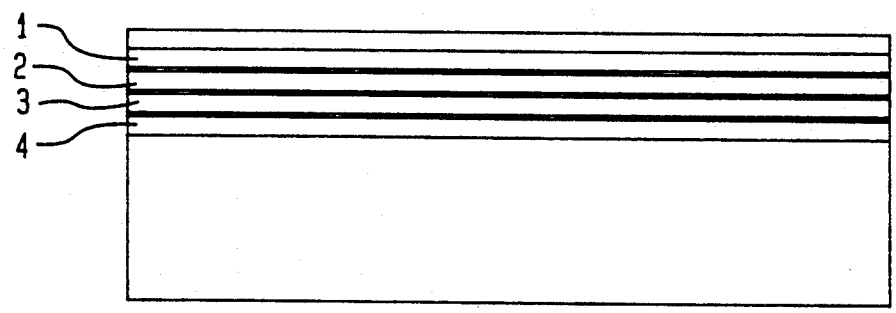
FIG. 4 is a pictorial view of the magnetic stripes on a standard airline ticket.
Figure 5:
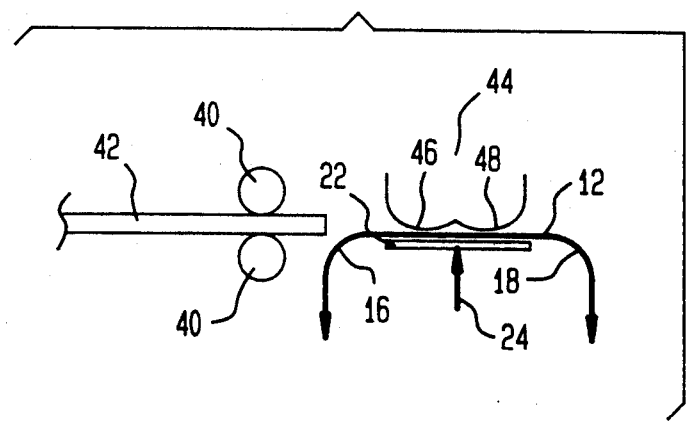
FIG. 5 is a schematic view of a pressure pad illustrating the teachings of this invention and shown in combination schematically with a transducent head and the document transport mechanism.

Referring now to FIGS. 4 and 5, in operation a card transport mechanism (e.g. rollers 40) translate a card 42 past a transducing head 44. The card 42 has four magnetic stripes marked 1, 2, 3 and 4 in FIG. 4, which extend along the length of the card and over roughly one inch of its width. The compression spring 24 urges plate 22 and the elastomeric belt 12 above the support shoulders 16 and 18 on the pressure pad. Preferably, in the absence of a document, the plane of transducent gaps 46 and 48 in the head 44 touch the surface band 12. The band 12 provides a low-friction surface for the card 42 and the plate 22 urges the card into contact with the transducent gaps without oscillation owing to the interactive damping between the belt 12 and the system comprised of spring 24 and plate 22. At the same time, good contact is provided at low pressures between the document and the head, reducing any tendency for the system to jam and prolonging head life.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. In a system for recording information on and reading information from a plurality of adjacent magnetic stripes on a document as said document is transported past a transducent head, a pressure pad for urging said document against said transducer comprising;
- a base which includes a pair of spaced apart supports;
- a elastomeric band secured under tension to said base and extending between said supports;
- a plate disposed between said supports;
- a spring supported by said base and coupled to said plate, said spring urging said plate against the lower surface of said band whereby the upper surface of said band is urged in the direction of said transducer.

2. In a system as in claim 1 further including a low friction coating on the upper surface of said band between said supports.

3. In a system as in claim 2 wherein the frequency response of said band is low compared to the frequency response of said spring.

4. In a system as in claim 1 wherein the frequency response of said band is low compared to the frequency response of said spring.